United States Patent
Gao

(10) Patent No.: US 8,824,332 B2
(45) Date of Patent: Sep. 2, 2014

(54) METHOD FOR SELECTING CLOCK SOURCE IN SYNCHRONIZATION DIGITAL HIERARCHY NETWORK

(75) Inventor: Rui Gao, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 195 days.

(21) Appl. No.: 13/141,361

(22) PCT Filed: Dec. 31, 2009

(86) PCT No.: PCT/CN2009/076310
§ 371 (c)(1),
(2), (4) Date: Jun. 22, 2011

(87) PCT Pub. No.: WO2010/148622
PCT Pub. Date: Dec. 29, 2010

(65) Prior Publication Data
US 2012/0087453 A1    Apr. 12, 2012

(30) Foreign Application Priority Data
Jun. 25, 2009   (CN) .......................... 2009 1 0148676

(51) Int. Cl.
*H04L 12/28* (2006.01)
*H04J 3/06* (2006.01)

(52) U.S. Cl.
CPC .................................. *H04J 3/0688* (2013.01)
USPC ........................... 370/254; 370/401; 370/509

(58) Field of Classification Search
None
See application file for complete search history.

(56) References Cited

U.S. PATENT DOCUMENTS

| | | | |
|---|---|---|---|
| 5,886,996 A * | 3/1999 | Wolf | 370/507 |
| 5,955,959 A * | 9/1999 | Taki et al. | 370/509 |
| 6,023,467 A * | 2/2000 | Abdelhamid et al. | 370/236.2 |
| 6,134,245 A * | 10/2000 | Scarmalis | 370/474 |
| 6,144,675 A * | 11/2000 | Wakabayashi et al. | 370/516 |
| 6,317,475 B1 * | 11/2001 | Kasurinen | 375/356 |
| 6,567,422 B1 * | 5/2003 | Takeguchi et al. | 370/503 |
| 6,628,674 B1 * | 9/2003 | Tanonaka | 370/503 |
| 6,707,828 B1 * | 3/2004 | Wolf | 370/503 |
| 6,807,194 B1 | 10/2004 | Muto | |
| 7,012,934 B1 * | 3/2006 | Nisbet et al. | 370/503 |

(Continued)

FOREIGN PATENT DOCUMENTS

| | | |
|---|---|---|
| CN | 1352500 A | 6/2002 |
| CN | 1612516 A | 5/2005 |
| CN | 101159533 A | 4/2008 |

OTHER PUBLICATIONS

International Search Report for PCT/CN2009/076310 dated Mar. 29, 2010.

*Primary Examiner* — Gregory Sefcheck
*Assistant Examiner* — Joshua Smith
(74) *Attorney, Agent, or Firm* — Banner & Witcoff, Ltd.

(57) ABSTRACT

A method for selecting a clock source in Synchronization Digital Hierarchy (SDH) network and a clock module are provided in the present invention. The method includes: generating a clock information message based on the clock quality information in SDH network, and the clock module of every network node in said SDH network independently selects a clock source by using said clock information message. The method and clock module for selecting a clock source in SDH provided in the present invention enable automatic switch and recovery for a clock source, and effectively solve the problem of clock looping, and adequately maintain the compatibility with the existing system without increasing the cost of the system.

7 Claims, 2 Drawing Sheets

(56) References Cited

U.S. PATENT DOCUMENTS

| | | | |
|---|---|---|---|
| 7,050,450 B1 * | 5/2006 | Hennen et al. | 370/426 |
| 2002/0085563 A1 * | 7/2002 | Mesh et al. | 370/393 |
| 2006/0039347 A1 * | 2/2006 | Nakamura et al. | 370/503 |
| 2006/0245453 A1 * | 11/2006 | Bedrosian | 370/503 |
| 2007/0053372 A1 * | 3/2007 | Liu et al. | 370/503 |
| 2007/0270117 A1 * | 11/2007 | Lin | 455/334 |
| 2009/0207863 A1 * | 8/2009 | Cheng et al. | 370/498 |

* cited by examiner

METHOD FOR SELECTING CLOCK SOURCE IN SYNCHRONIZATION DIGITAL HIERARCHY NETWORK

TECHNICAL FIELD

The present invention relates to Synchronization Digital Hierarchy (SDH) technology in communication field, and specially, to a method for selecting clock source in synchronization digital hierarchy network.

BACKGROUND OF THE RELATED ART

In synchronization digital communication network (SDH/SONET), synchronization between network element nodes in network is done by clock unit, and synchronization relates directly to the quality of network service. If there are problems in the clock within network, it will lead to adjustment of service data pointer, and will even lead to a breakdown of the entire network.

Traditional transmission network uses Synchronization Status Message (SSM) protocol to finish the selecting operation of clock source, and this selecting method is recorded in the relevant specifications of International Telecommunication Union (ITU). The described SSM is used to transfer the quality grade of a timing signal, so that the node in SDH network reads and analyzes SSM to obtain the information of upstream and transfer the synchronization information of this node to a downstream node. When a network node selects optimal clock source and locks the clock source, it mainly takes SSM information as a selection basis, and this method may ensure that the clock synchronization is maintained in the entire transmission network, but can't detect the deterioration condition of clock source.

In the current SDH network, during the process of clock unit selecting clock source, the approach which is widely used is to estimate approximately the deterioration degree of clock source by calculating the number of network nodes passed during transmitting clock source, and can't detect accurately the actual deterioration degree of clock source, and avoids clock looping by increasing extra operation administration and maintenance (OAM) bytes.

In addition, it still remains on the basis of operators making logical analysis and judgment according to data provided by system in network administration aspect, and clock source can't be selected by SDH network automatically. Even if the currently selected reference clock source deteriorates to a quite serious degree, the system still think possibly that the signal is the best at present, and the system can't auto-switch clock source under this condition.

SUMMARY OF THE INVENTION

The technical problem to be solved by the present invention is to provide a method for selecting a clock source to select a network element clock source in SDH network automatically.

In order to solve the above technical problem, the present invention is to provide a method for selecting a clock source in synchronization digital hierarchy network, comprising:

generating a clock information message according to clock quality information in the synchronization digital hierarchy network, and a clock module of every network node in the synchronization digital hierarchy network independently selecting a clock source by using the clock information message.

Preferably, the method further comprises: encapsulating the clock information message using International Telecommunication Union Standard High-level Data Link Control Protocol and segmenting the message, and then inserting the message into reserved OAM bytes of synchronization digital hierarchy frames in unit of a plurality of bytes for transmission.

Preferably, the clock quality information comprises a quality grade, a priority, a clock variance and a clock source identifier.

Preferably, for the received clock information messages sent by different neighbor network nodes, the each clock module in turn compares the quality grades, priorities and clock variances of the clock information messages sent by different neighbor network nodes and selects a clock source according to a result of the comparison.

Preferably, for the received clock information messages sent by different neighbor network nodes, a clock source with the highest quality grade is selected, if the clock source with the highest quality grade is not unique, a clock source with the highest priority is selected therefrom, and if the clock source with the highest priority is not unique, clock variances of the clock sources with the highest priority are calculated, and a clock source with the minimum clock variance is selected.

Preferably, the method further comprises:

taking the selected clock source as a reference clock source, each network node judging whether the clock source identifier of the reference clock source is the same with its own clock source identifier, to judge whether the clock loops.

Preferably, the method further comprises:

taking the selected clock source as a reference clock source, tracking the reference clock source and judging whether a deterioration value exceeds a preset threshold, if yes, reducing the quality grade and priority of the clock quality information, regenerating the clock information message and reselecting a clock source, otherwise judging whether the reference clock source is a valid clock source, if the reference clock source is a valid clock source, the clock module locking the reference clock source, if the reference clock source is not a valid clock source, the clock module entering into holdover mode or free oscillation mode.

Preferably, the deterioration value exceeding the preset threshold comprises at least one of the following cases:

a preset locking time limit is exceeded and the reference clock source cannot be locked;

a frequency offset of the locked reference clock source exceeds a preset frequency offset threshold; and it is detected that a system phase mutation exceeds a preset mutation threshold.

Preferably, the clock information message carries time information.

The present invention also provides a clock module for supporting selecting a clock source in synchronization digital hierarchy network, the clock module being configured to select a clock source independently according to clock information message.

Preferably, the clock module is configured to select a clock source independently according to the clock information message in the following way:

for the received clock information messages sent by different neighbor network nodes, the each clock module compares in turn quality grades, priorities and clock variances of the clock information messages sent by the different neighbor network nodes, and selects a clock source according to a result of the comparison.

Preferably, the clock module selects a clock source according to a result of the comparison in the following way:

for the received clock information messages sent by different neighbor network nodes, the clock module selects a clock source with the highest quality grade, and if the clock source with the highest quality grade is not unique, selects a clock source with the highest priority therefrom, and if the clock source with the highest priority is not unique, calculates the clock variances of the clock sources with the highest priority, and selects a clock source with the minimum clock variance.

Compared with the prior art, the method for selecting a clock source in SDH network provided by the present invention implements automatic switching and recovery of a clock source, and solves the problem of clock looping effectively without increasing the system cost, and maintains fully the compatibility with the existing system.

PREFERRED EMBODIMENTS OF THE PRESENT INVENTION

Embodiments of the present invention are explained in detail in conjunction with accompanying drawings and examples below, to understand fully how to solve the technical problem by applying technical means and the implementation process to achieve the technical effect in the present invention, and to carry it out based on the understanding.

Figure 1:
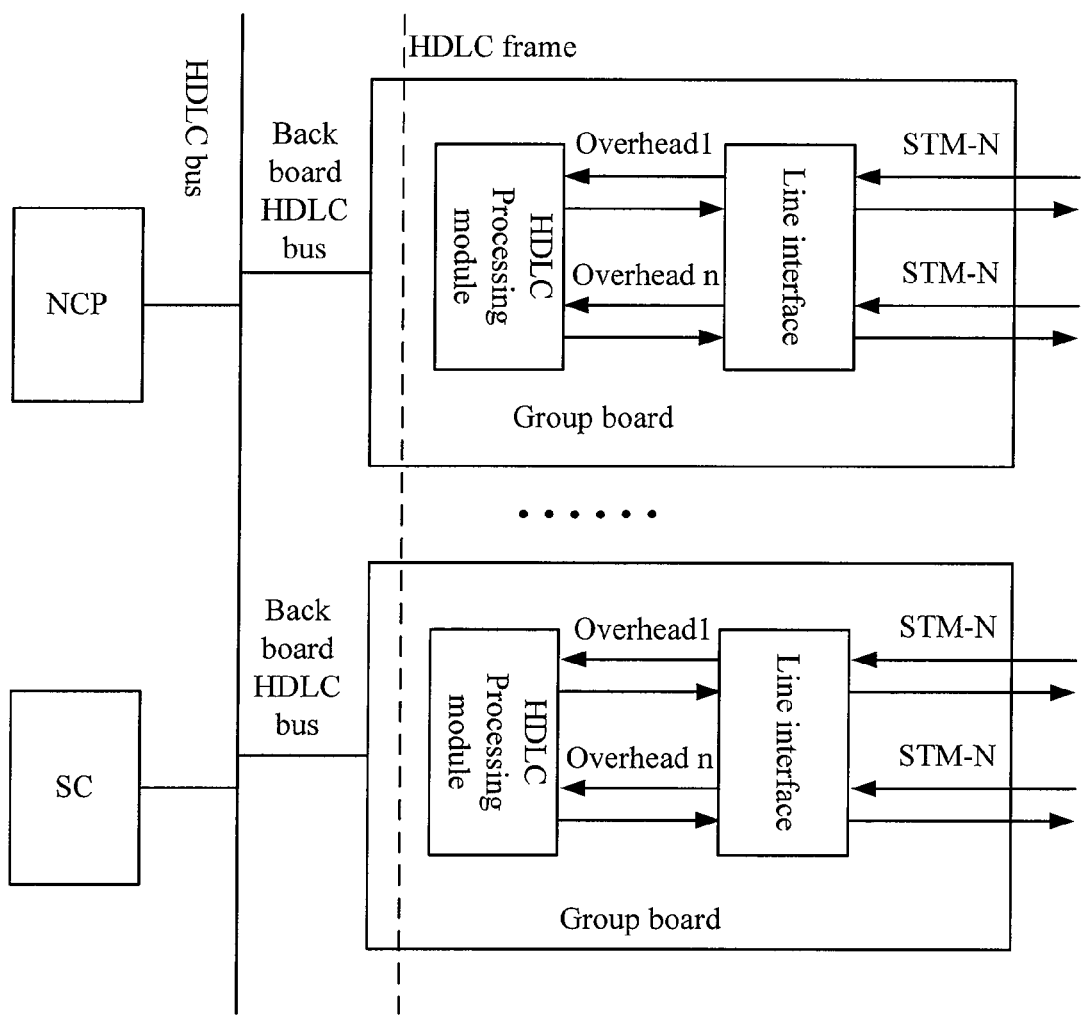
FIG. 1 is a schematic diagram of SDH network structure in the prior art.

FIG. 1 is a schematic diagram of SDH network structure in the prior art. At first, it will illustrate, in conjunction with the SDH network as shown in FIG. 1, that the present invention uses a clock information message rather than an OAM byte S1 used in the prior art to transfer clock information. In the technical scheme of the present invention, the clock information message is generated according to the quality information of clock in SDH communication network, such as quality grade, priority, clock variance of clock source and clock source identifier (ID). The clock module of each network node in SDH communication network selects a clock source independently based on the content of the clock information message.

SDH frames rather than messages are transmitted in SDH network, therefore in order to identify the clock information message used in this invention in time by network node, the present invention segments the encapsulated messages after encapsulating the clock information message using ITU standard High-level Data Link Control (HDLC) protocol, and inserts them into the reserved OAM bytes of SDH frames in unit of several bytes and transfers them to neighbor node network element. Correspondingly, when group board receives the Synchronous Transport Module level N (STM-N) frames of the neighbor node network element, the line performs parallel-to-serial conversion for OAM bytes analyzed from the STM-N frames, and transmits them to HDLC processing module, and transmits the data to HDLC bus of back board. The relay equipment also needs to support the processing for the reserved OAM bytes.

The technical scheme of the present invention uses the clock information message to transfer the quality information of clock in SDH communication network, such as quality grade, priority, clock variance of clock source and clock source identifier, and the clock module of each network node in SDH communication network selects a clock source independently based on the content of the clock information message.

In addition, configuring clock source by ITU-T standard algorithm will often lead to clock looping, while timing loop must be avoided within synchronization network, because:

(1) after a timing signal loops, the clock within loop is out of synchronization control of the reference clock in this section, affecting the accuracy of an output signal of clock;

(2) the clock within loop forms self-feedback, resulting in frequency instability.

Therefore, how to avoid the condition of clock looping also needs to be considered when a clock source is selected.

Figure 2:
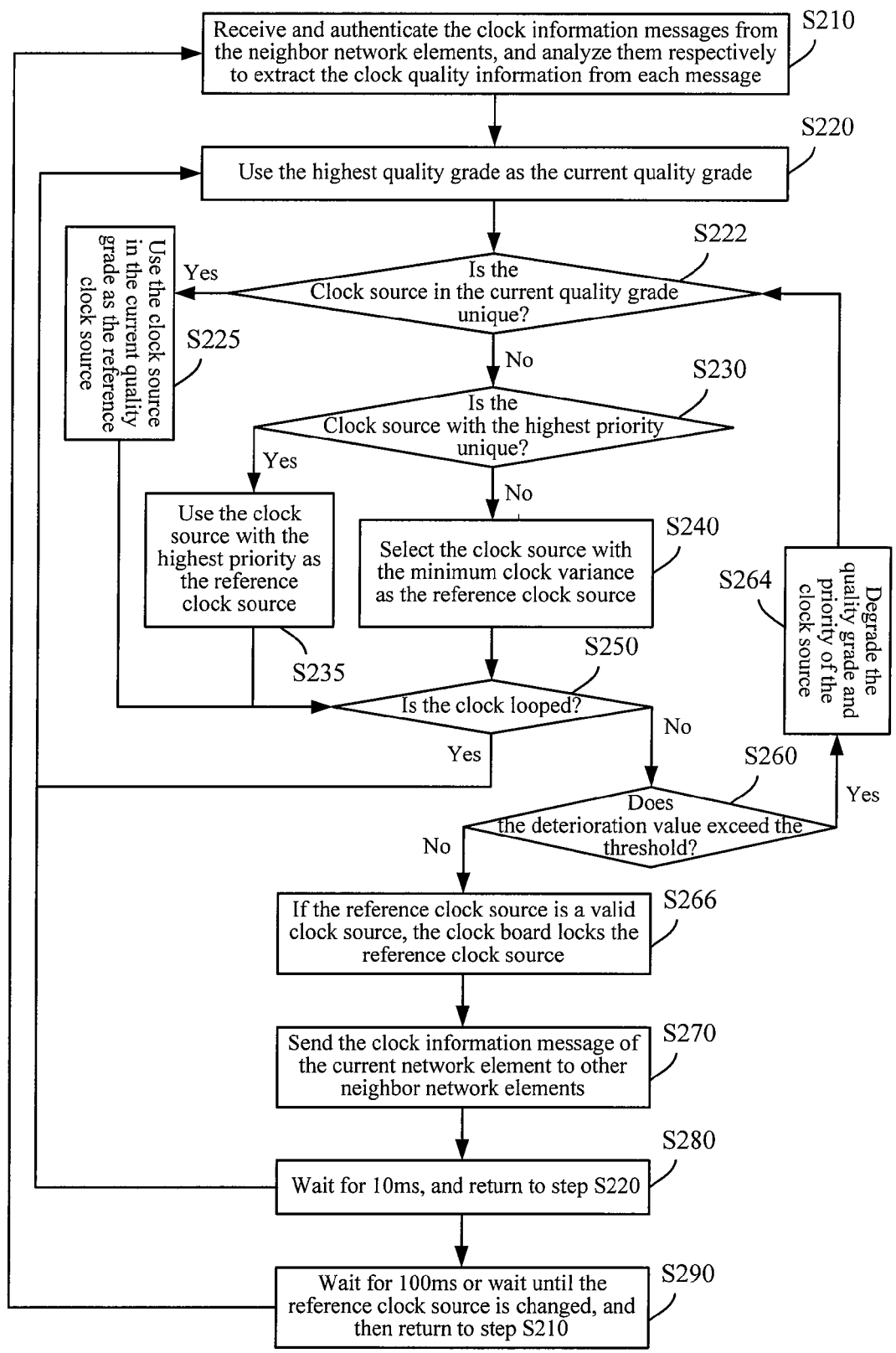
FIG. 2 is a flow chart of an embodiment of clock selecting method in the present invention.

FIG. 2 is a flow chart of an embodiment of clock selecting method in the present invention. In the embodiment of this method, suppose there are five clock sources to be selected, wherein, the first clock source is from the first device, the second clock source is from the second device, the third clock source is from the third device, the fourth clock source is from fourth device and the fifth clock source is from the fifth device. In conjunction with the schematic diagram of SDH network structure shown in FIG. 1, the method embodiment shown in FIG. 2 mainly comprises the following steps:

step S210, receive and authenticate the foregoing five clock information messages from the neighbor network node, and analyze the five clock information messages respectively, and extract the quality information of clock from each message, such as quality grade, priority, clock variance of clock source and clock source ID, as a reference to select a clock source;

step S220, compare quality grades of the extracted five clock sources, and choose the highest quality grade as the current quality grade;

step S222, judge whether the clock source with the current quality grade is unique, and if yes, go to step S225, otherwise go to step S230;

in steps S220 and S222, after comparing quality grades of the foregoing five clock sources, if it is judged that the quality grades of the first clock source, the second clock source, the third clock source and the fourth clock source are equal and higher than that of the fifth clock source, then go to step S230 to proceed;

step S225, the clock source with the current quality grade is taken as a reference clock source, and then go to step S250;

step S230, further compare the priorities of these clock sources with the same quality grade, and judge whether the clock source with the highest priority is unique, and if yes, go to step S235, otherwise go to step S240;

in this step, compare the priorities of the four clock sources with the same quality grade, and if it is judged that the priorities of the first clock source, the second clock source and the third clock source are equal and higher than that of the fourth clock source, then go to step S240 to proceed;

step S235, the clock source with the highest priority is taken as a reference clock source, and then go to step S250;

step S240, further compare clock variances of these clock sources with the same priority, that is, use the period (10 ms) adjusted by VCXO to read nth phase discrimination value, and calculate clock variance according to the nth phase discrimination value and select the clock source with the minimum clock variance as a reference clock source; in practical application, the case that the clock source with the minimum clock variance is not unique will hardly occur, and even if it occurs, just to select one at random as a reference clock source;

in this step, compare clock variances of the three clock sources with equal priority, and if it is judged that the clock variance of the first clock source is minimum, then select the first clock source as a reference clock source;

step S250, judge whether clock source ID of a reference clock source is the same with that of this network node (i.e.

itself), to judge whether clock loops; if clock source ID of a reference clock source is the same with that of this network node, it indicates that clock loops, then exclude this determined reference clock source, and return to step S220 to reselect a reference clock source from the remaining clock sources, otherwise go to step S260;

step S260, track a reference clock source, and check the quality of a clock signal of the reference clock source and judge whether the deterioration value exceeds a preset threshold, and if yes, go to step S264, otherwise go to step S266;

judge whether the deterioration value exceeds a preset threshold, i.e. detect whether at least one of the following conditions occurs, and if yes, it is considered that the deterioration value exceeds the preset threshold, otherwise it is considered that the deterioration value does not exceed the preset threshold;

(1) the deterioration value exceeds a preset locking time limit (5 minutes in this embodiment) so that a reference clock source cannot be locked;

(2) the frequency offset of the locked reference clock source is relatively large, and the value of frequency offset exceeds a preset threshold of frequency offset (±4.6 PPM in this embodiment);

(3) it is detected that the sudden change of the system phase exceeds a preset threshold of sudden change;

step S264, reduce the quality grades and priorities of the clock sources at the same time, and take the reduced quality grades as new current quality grades, and return to step S222 to reselect a reference clock source;

step S266, if the reference clock source is a valid clock source, the clock module will lock the reference clock source, and guarantee that the clock of this board and the reference clock source are same in frequency and phase; if the reference clock source is not a valid clock source, the clock of this board will switch into holdover mode or free oscillation mode (the current clock state of the clock of this board is holdover, or if the selected clock is locking phase constantly and has been into locked state before switching, then the clock of this board switch into the holdover mode, otherwise the clock of this board switch into free oscillation mode), and then execute step S270;

step S270, the information of this network node, such as system clock quality grade, priority, clock source ID and clock accuracy, is transmitted to other neighbor network nodes by clock information messages;

step S280, wait for several time slices (10 ms in this embodiment), and return to step S220;

step S290, wait for several time slices (100 ms in this embodiment) or wait until a reference clock source changes, and then return to step S210.

The above step S280 is to check the locking condition of system clock in clock module every one period of time (10 ms) within this network element node, or to switch, or to recover, or to hold; when a period of 100 ms is up, execute step S290, and receive the message information of neighbor node network element and the configuration of network administration again, and judge whether the alternative condition changes, and if yes, reselect a clock source.

The existing methods for selecting clock source are all directed at each network element node, thus a great deal of configuration work needs to be done manually for the clock source of each network node by network administrators in network administration, which often depends on the experience and carefulness of network administrators, and efficiency and accuracy are hard to be ensured. While, the method for selecting clock source in the present invention is to perform the automatic selection by transferring the quality information of each clock source to each network node in network, and can select clock source in network without excessive intervention of network administrators, thus improving accuracy and work efficiency.

The technical scheme of the present invention uses the clock information message instead of previous S1 OAM byte, and the transferred clock source information is greatly increased, which contributes to better judgment of the quality of clock source and also has good scalability, for example, modifying the content of message easily according to needs, optimizing the method according to the modified message, even also adding some short information, such as time information of node network element etc., in the message, thus it is allowed to transfer time among each network node etc. The technical scheme of the present invention also avoids clock looping effectively, and when the reference clock source deteriorates, the system can switch and recover automatically without manual intervention.

The embodiment of the present invention is disclosed above, but the described content is only an embodiment used by the present invention for ease of understanding, not intended to limit the present invention. Any skilled in the technical field to which the present invention belongs, may make any modifications and changes to the form and details of implementation without departing from the spirit and scope disclosed by the present invention, but the scope of patent protection of the present invention still needs to be subject to the scope defined by the appended claims.

Industrial Applicability

Compared with the prior art, the method for selecting clock source in SDH network provided by the present invention implements automatic switching and recovery of clock source, and solves the problem of clock looping effectively without increasing the system cost, and maintains fully the compatibility with the existing system.

What is claimed is:

1. A method for selecting a clock source in a synchronization digital hierarchy network, comprising:

network nodes in said synchronization digital hierarchy network generating standalone clock information packets from clock quality information and transmitting the clock information packets to neighbor network nodes, wherein each of said clock information packets contains information of a quality grade, a priority, a clock variance and a clock source identifier; and a clock module of every network node in said synchronization digital hierarchy network independently selecting a clock source by using said clock information packets, wherein the step of a clock module of every network node in said synchronization digital hierarchy network independently selecting a clock source by using said clock information packets comprises:

for the received clock information packets sent by different neighbor network nodes, said each clock module comparing in turn the quality grades, priorities and clock variances in the clock information packets sent by the different neighbor network nodes and selecting a clock source according to a result of the comparison; and wherein the step of selecting a clock source according to a result of the comparison comprises:

for the received clock information packets sent by different neighbor network nodes, selecting a clock source with the highest quality grade, if said clock source with the highest quality grade is not unique, selecting a clock source with the highest priority therefrom, and if said clock source with the highest priority is not unique, calculating clock variances of said clock sources with the highest priority, and selecting a clock source with the minimum clock variance.

2. The method of claim 1, further comprising:
encapsulating said clock information packets using International Telecommunication Union Standard High-level Data Link Control Protocol and segmenting, in units of a plurality of bytes, the packets into segments, and then inserting the segments of the packets into reserved operation administration and maintenance (OAM) bytes of synchronization digital hierarchy frames respectively for transmission.

3. The method of claim 1, further comprising:
taking the selected clock source as a reference clock source, and each network node judging whether the clock source identifier of said reference clock source is the same as its own clock source identifier, to judge whether the clock loops.

4. The method of claim 1, further comprising:
taking the selected clock source as a reference clock source, tracking said reference clock source and judging whether a deterioration value of said reference clock source exceeds a preset threshold, if yes, reducing the quality grade and priority of said clock quality information of said reference clock source and reselecting a clock source, otherwise judging whether said reference clock source is a valid clock source, if said reference clock source is a valid clock source, the clock module locking said reference clock source, if said reference clock source is not a valid clock source, the clock module entering into holdover mode or free oscillation mode.

5. The method of claim 4, wherein,
said deterioration value exceeding said preset threshold comprises at least one of the following cases:
a preset locking time limit is exceeded and said reference clock source cannot be locked;
a frequency offset of the locked reference clock source exceeds a preset frequency offset threshold; and
it is detected that a system phase mutation exceeds a preset mutation threshold.

6. The method of claim 1, wherein,
said clock information packets also carry time information.

7. A clock board supporting selecting a clock source in a synchronization digital hierarchy network, said clock board being located in a network node in the synchronization digital hierarchy network, and being configured to select a clock source independently according to standalone clock information packets received by the local network node from neighbor network nodes, wherein the clock information packets are generated by the network nodes in the synchronization digital hierarchy network from clock quality information, and each of said clock information packets contains information of a quality grade, a priority, a clock variance and a clock source identifier, wherein, said clock board is configured to select a clock source independently according to the clock information packets in the following way:

for the received clock information packets sent by different neighbor network nodes, said each clock board compares in turn quality grades, priorities and clock variances in the clock information packets sent by said different neighbor network nodes, and selects a clock source according to a result of the comparison, wherein, said clock board selects a clock source according to a result of the comparison in the following way:

for the received clock information packets sent by different neighbor network nodes, the clock board selects a clock source with the highest quality grade, and if said clock source with the highest quality grade is not unique, selects a clock source with the highest priority therefrom, and if said clock source with the highest priority is not unique, calculates the clock variances of said clock sources with the highest priority, and selects a clock source with the minimum clock variance.

* * * * *